(12) United States Patent
Pospisil et al.

(10) Patent No.: US 7,475,914 B2
(45) Date of Patent: Jan. 13, 2009

(54) ROTARY UNION FOR DIRECTING A HEAT EXCHANGE FLUID

(76) Inventors: Mark G. Pospisil, 8 W. Granville Ave., Park Ridge, IL (US) 60068; Zbigniew Kubala, 38300 N. Manor Ave., Beach Park, IL (US) 60087; Paul M. Masini, 402 S. Deborah La., Mount Prospect, IL (US) 60056

( * ) Notice: Subject to any disclaimer, the term of this patent is extended or adjusted under 35 U.S.C. 154(b) by 490 days.

(21) Appl. No.: 11/224,369

(22) Filed: Sep. 12, 2005

(65) Prior Publication Data

US 2006/0082143 A1 Apr. 20, 2006

Related U.S. Application Data

(60) Provisional application No. 60/610,119, filed on Sep. 14, 2004.

(51) Int. Cl.
*F16L 27/00* (2006.01)
*F16L 39/04* (2006.01)

(52) U.S. Cl. .............. 285/121.5; 285/121.3; 285/121.4

(58) Field of Classification Search .............. 285/121.1, 285/121.2, 121.3, 121.4, 121.5, 121.6, 94, 285/98, 272, 900
See application file for complete search history.

(56) References Cited

U.S. PATENT DOCUMENTS

| | | | | |
|---|---|---|---|---|
| 2,063,368 | A | * 12/1936 | De La Roza, Sr. | 277/366 |
| 2,352,317 | A | * 6/1944 | Goff et al. | 285/121.7 |
| 2,805,087 | A | * 9/1957 | Shaw et al. | 285/121.4 |
| 2,836,439 | A | * 5/1958 | Moore | 285/279 |
| 2,873,538 | A | 12/1959 | Shumaker | |
| 3,061,337 | A | * 10/1962 | Shaw et al. | 285/121.4 |
| 3,874,707 | A | 4/1975 | Calkins et al. | |
| 4,254,972 | A | 3/1981 | Widenbeck et al. | |
| 4,477,107 | A | * 10/1984 | Ferguson et al. | 285/121.4 |
| 4,606,560 | A | 8/1986 | McCracken | |
| 4,632,431 | A | * 12/1986 | McCracken | 285/13 |
| 4,635,969 | A | * 1/1987 | Jackson | 285/95 |
| 4,758,026 | A | * 7/1988 | Timm | 285/121.4 |
| 5,110,162 | A | 5/1992 | Peter et al. | |
| 5,226,677 | A | 7/1993 | Peter et al. | |
| 5,454,572 | A | * 10/1995 | Pospisil | 277/368 |

FOREIGN PATENT DOCUMENTS

EP 0528510 A 2/1993

OTHER PUBLICATIONS

Anonymous, Deublin-Sint Steam Joints and Hot Oil Joints for the Paper Industry, Promotional Pamphlet, 1996, pp. 9-11, 15.
Anonymous, Deublin Rotating Unions, Catalog, 1996, pp. 32-36.

* cited by examiner

*Primary Examiner*—James M Hewitt
(74) *Attorney, Agent, or Firm*—Paul L. Brown

(57) ABSTRACT

A rotary union for supplying a heat exchange fluid to a rotating body includes a pair of hydrodynamic bushing bearings to retain the union housing within the desired alignment with the rotating body, a thrust bearing assembly secured to the rotating body, and a seal assembly positioned forwardly of the pair of bushing bearings. The hydrodynamic bushing bearings are located within the union and are lubricated by the flow of the heat exchange fluid within the union.

13 Claims, 4 Drawing Sheets

ROTARY UNION FOR DIRECTING A HEAT EXCHANGE FLUID

CROSS-REFERENCE TO RELATED APPLICATION

This application is related to and claims the benefit of U.S. Provisional Application Ser. No. 60/610,119 filed Sep. 14, 2004, the teachings of which are incorporated herein by reference.

FIELD OF THE INVENTION

The present invention relates to a rotary union having bushing bearings therein and which are positioned within the flow of the heat exchange fluid from the non-rotating body to a rotating member.

BACKGROUND OF THE INVENTION

A plurality of rotary union structures exist for supplying a heat exchange fluid, such as oil, to a rotating body or load. In the past, one type of self-supported rotating union includes a pair of carbon graphite bearing structures which support and retain the alignment of the rotary union housing with respect to the rotating a rotor or shaft and wherein the rotor or shaft member encircles a siphon pipe through which the hot oil is removed from the interior of a rotating body or load. Such rotating unions may include a pair of carbon graphite bushing bearings and a seal assembly which also acts as a thrust bearing assembly to absorb the thrust forces generated by fluid pressure within the union. The rotary housing is mounted and aligned with respect to the rotating rotor or shaft by the pair of carbon graphite bushing bearings to maintain the housing and the rotor in alignment during operation. However, the front graphite bushing bearings are not in contact with the pumped fluid and, accordingly, such rotary unions have a limited operational temperature of a maximum of about 450° F. and approximately 200 RPMs.

Another attempt to provide a self-supported rotary union for communicating a heat exchange fluid to a rotating drum is a rotary union that includes anti-friction rotating bearings located within bearing housings which provide support for the rotary union's housing with respect to the rotating load. When such roller bearing structures are utilized to support and align the rotary housing in a union supplying hot oil to a load, it has been found that the roller bearing structures are generally operable to a maximum operating temperature of 300° F. Thus, such roller bearing structures require auxiliary lubricating and cooling systems to supply a lubricating oil or a high temperature lubricating grease to the bearing assembly. Accordingly, such complicated rotary unions require expensive high temperature lubricating greases and also result in a change in physical property and performance according to the temperature of the union. Therefore, such union structures are expensive to manufacture and possess a shortened service life.

SUMMARY OF THE INVENTION

It is one object of the present invention to provide a rotary union for supplying a heat exchange fluid to a rotating body or load which utilizes hydrodynamic bushing bearings to retain the rotary union housing within the desired alignment with respect to the rotating body or load.

It is a further object of the present invention to provide a rotary union for delivering a heat exchange fluid to a rotating body or load wherein the rotary union housing is retained in alignment with respect to the rotating body by bushing bearings engaging the rotating body or load.

It is yet another object of the present invention to provide a rotary union wherein a pair of bushing bearings are utilized to support the rotary union with respect to a rotating load and wherein the bushing bearings are lubricated by the fluid flow within the union.

The present invention provides a novel rotary union for supplying a hot oil to a rotating rotor or load which includes a rear bushing bearing assembly and a front bushing bearing assembly which provide the support for the union housing with respect to the rotating load. The rear or first bushing bearing assembly includes a bearing sleeve mounted for rotation with the rotor and a bearing housing member having an outer radial curved surface mounted within a bore of the cylindrical housing of the rotary union. The bearing housing member includes a graphite wearing portion for engagement with the bearing sleeve member to retain the housing within the desired alignment with respect to the rotating load. The front or second bushing bearing assembly includes a bushing sleeve mounted for rotation with the rotor and also includes a bearing housing member having an outer radial curved surface and includes a graphite wearing portion for structurally receiving and engaging a bearing sleeve mounted to the rotor. In each of the rear and front bushing bearing assemblies, the bearing housing member includes an outer curved radial surface that is structurally arranged to engage the inside surface or bore of the cylindrical housing member to properly align the graphite-wearing portions of both bushing bearing assemblies with the bearing sleeves mounted to the rotor.

The self-supported rotary union further includes a thrust bearing assembly comprised of a metallic thrust plate member that is mounted to the rotor for rotation thereby, a carbon graphite spherical ring member and a metallic ring having a spherical contact surface. The spherical contact surface of the metallic ring presents a mating face with the spherical counterface of the carbon graphite ring to absorb the mechanical load from the metallic thrust plate member.

Additionally, the rotating union includes a front seal assembly which is comprised of a rotating seal face member fixed to the rotor shaft and a floating seal face member that is spring biased and mounted to the union housing. The front seal assembly is positioned within the rotary union outside of the front bushing assembly. Engagement of the seal facings of the floating and the rotating seal faces occurs when hot oil is passed through the union to contact the front seal assembly which retains the fluid flow within the union.

By positioning the front floating seal assembly outside the front bushing bearing assembly, both the rear bushing bearing assembly and the front bushing bearing assembly are located within the fluid flow of the rotating union. Accordingly, this structure, when coupled with the hydrodynamic bearing system which includes sleeve bearings and a thrust bearing, eliminates the need for external lubrication of the bushing bearing assemblies with expensive, high temperature grease or lubricants. Additionally, there is substantially no change in physical properties of the bushing bearing assemblies with the temperature changes required of the pumped fluid within the union. Accordingly, a rotary union in accordance with the present invention is structurally arranged to operate within the range of up to 600° F. and up to 1,000 RPMs.

The present invention consists of certain novel features and structural details hereinafter fully described, illustrated in the accompanying drawings, and particularly pointed out in the appended claims, it being understood that various changes in the details may be made from the spirit, or sacrificing any of the advantages of the present invention.

DESCRIPTION OF THE DRAWINGS

For the purpose of understanding the present invention, there is illustrated in the accompanying drawings a preferred embodiment thereof, from an inspection of which, when considered in connection with the following description, the invention, its construction and operation, and many of its advantages will be readily understood and appreciated.

DESCRIPTION OF THE PREFERRED EMBODIMENT

Figure 1:
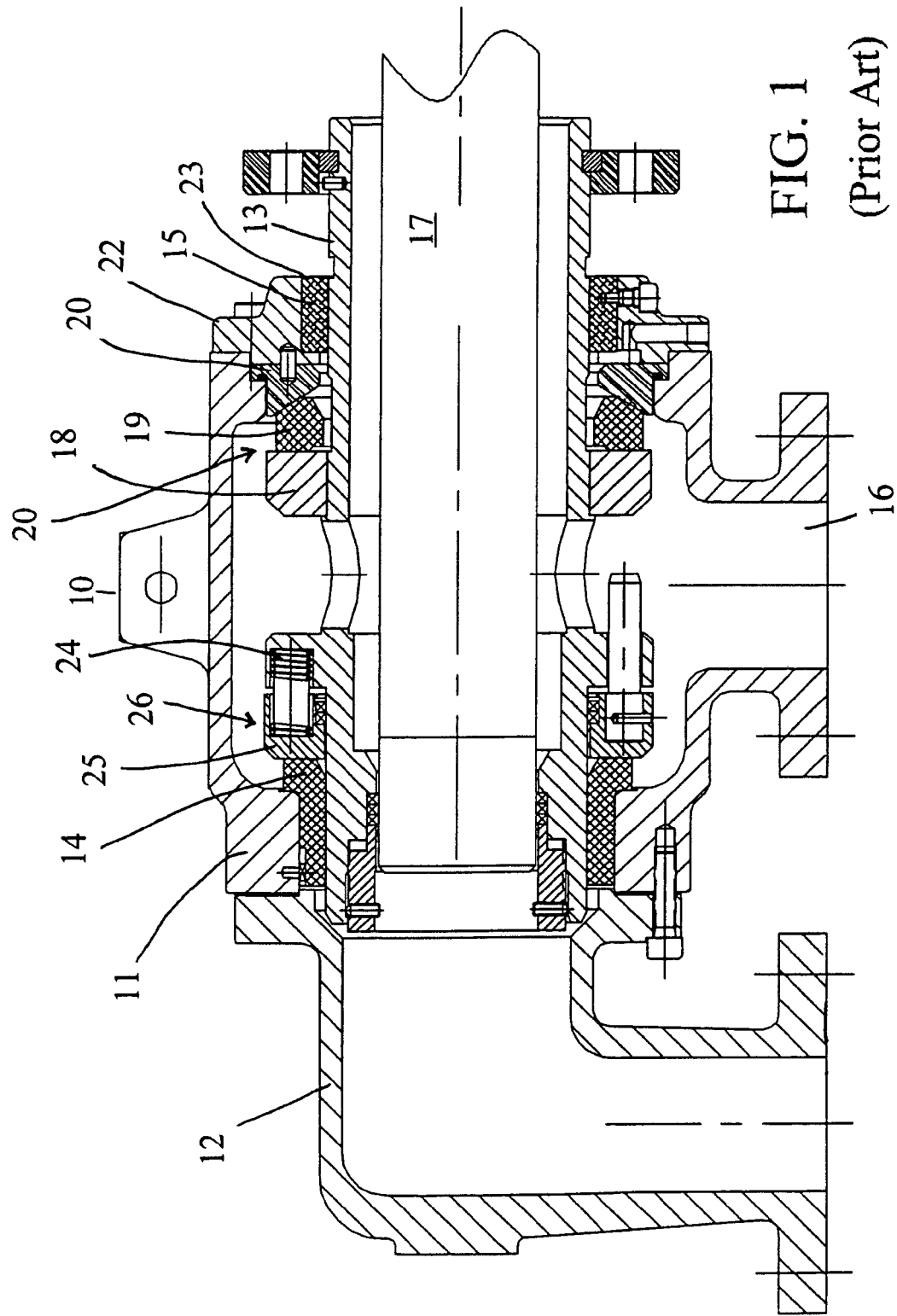
FIG. 1 illustrates a self-supported rotating union including a pair of carbon graphite bearing structures for mounting and supporting the rotation of a rotor in accordance with the prior art.

FIG. 1, which is labeled "Prior Art", illustrates a rotating union 10 which may be, for example, a rotary union of the Model H Series, commercially available from the Deublin Company, Waukegan, Ill. Referring now to drawings wherein like numerals have been used throughout the several views to designate the same or similar parts, a rotating union or joint 10 is designed for delivering hot oil or steam to applications in the paper, plastic and textile industries. The rotating union 10 includes a cylindrical housing 11, a head or end cap 12 and a tubular rotor 13. The union housing 11 is mounted on the rotor 13 by a rear support carbon graphite bearing 14 and a front support carbon graphite bearing 15. The heated oil enters into the rotary joint or union 10 through port 16, and a siphon pipe 17 is enclosed within the rotor 13 and communicates with the head or end cap 12. When the hot oil enters the rotary union, the oil passes along the siphon pipe 17 into a rotating drum (not shown). The return of the hot oil is through the siphon pipe and out the head 12 of the union 10.

The rotary union assembly 10 includes a seal assembly which includes a thrust plate 18 mounted to the rotor 13. The thrust plate is in contact with a spherical carbon ring member 19, which in turn is in contact with a spherical seal face member 20. The spherical seal face member is keyed to a supporting flange 22 that is secured to the housing 11. The junction between the carbon ring member 19 and the seal face member 20 provides a structure which absorbs the axial mechanical load from the thrust plate 18 and provides a sealing function for the union.

A supporting flange 22 associated with the housing 11 includes an annular recess 23 therein which is structurally arranged to receive the front support carbon graphite bearing 15 to provide support for the rotary union's housing. Positioned adjacent the rear support carbon graphite bearing 14 is a spring 24 biased counterface member 25 which provides a thrust bearing assembly 26 for the union. The hot oil rotating joint, illustrated in FIG. 1, operates generally at 90 psi and at temperatures of 600° F. and at a speed of up to about 350 RPMs.

Figure 2:
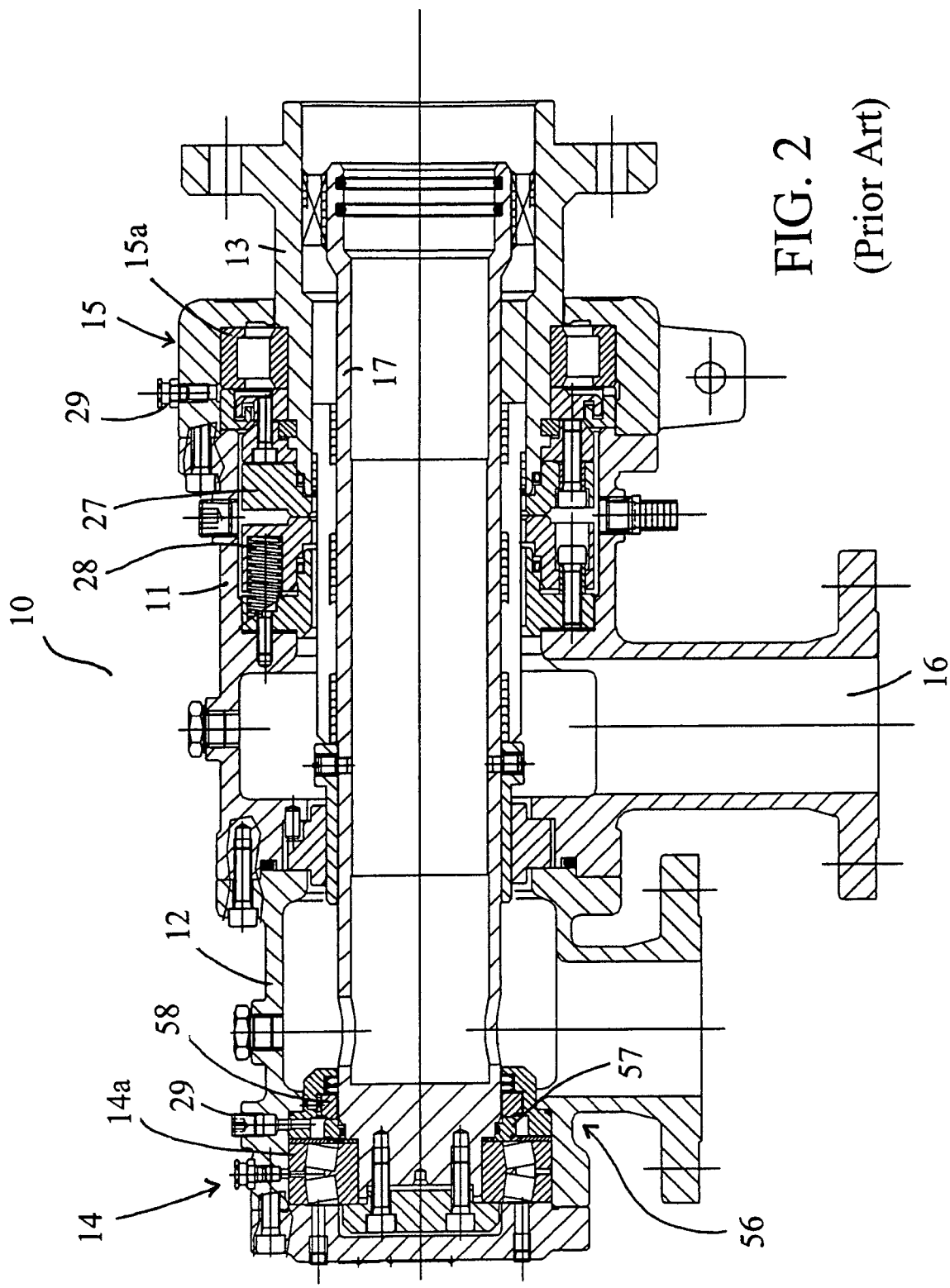
FIG. 2 illustrates a self-supported rotating union which includes a pair of roller bearing structures for mounting and supporting the rotation of a rotor or shaft in accordance with the prior art.

FIG. 2, which is also labeled "Prior Art" illustrates a rotating union 10 which may be, for example, a rotary union of the Model CK Series, commercially available from the Deublin Company, Waukegan, Ill. The rotating union 10 is designed for delivering hot oil to a rotating load member and includes a cylindrical housing 11, a head or end cap 12, a rotor or load 13 and a siphon pipe 17 located within the rotor. The hot oil is directed into the rotary union 10 through inlet port 16. Specifically, in FIG. 2 the rotating union 10 includes a rear support roller bearing assembly 14 and a front support roller bearing assembly 15 for supporting the rotary housing 11 with respect to the rotor or load 13. The outer annular race members 14a and 15a of the roller bearing assemblies 14 and 15, respectively, are positioned between a counter bore in the head 12 and in the housing 11, respectively. Positioned between the rear and front roller bearing assemblies is a rotating sealing member 27 and a floating sealing member 28, which is spring biased to engage the rotating sealing member 27 to provide a seal during operation of the rotary union.

Similarly, the rear roller bearing assembly 14 is isolated from the flow of oil through the union because of the existence of a rear sealing assembly 56. This assembly includes a rotating seal face member 57 keyed to the rotor and a floating seal face member 58 which provides a seal during operation of the rotary union.

The utilization of roller bearing assemblies 14 and 15 within the rotary union 10 requires expensive lubricants to be directed into the roller bearings assemblies through grease nipples 29 to cool the units and to lubricate the same. Thus, such complex and expensive union structures, as shown in FIG. 2, necessarily require the use of expensive high-temperature greases and lubricants and oftentimes result in a change of physical properties of the union bearing assemblies depending upon the temperature of the operating unit. Accordingly, such expensive unions generally operate at a pressure of 90 psi, at a temperature of 450° F. and at a speed of 850 RPMs.

Figure 3:
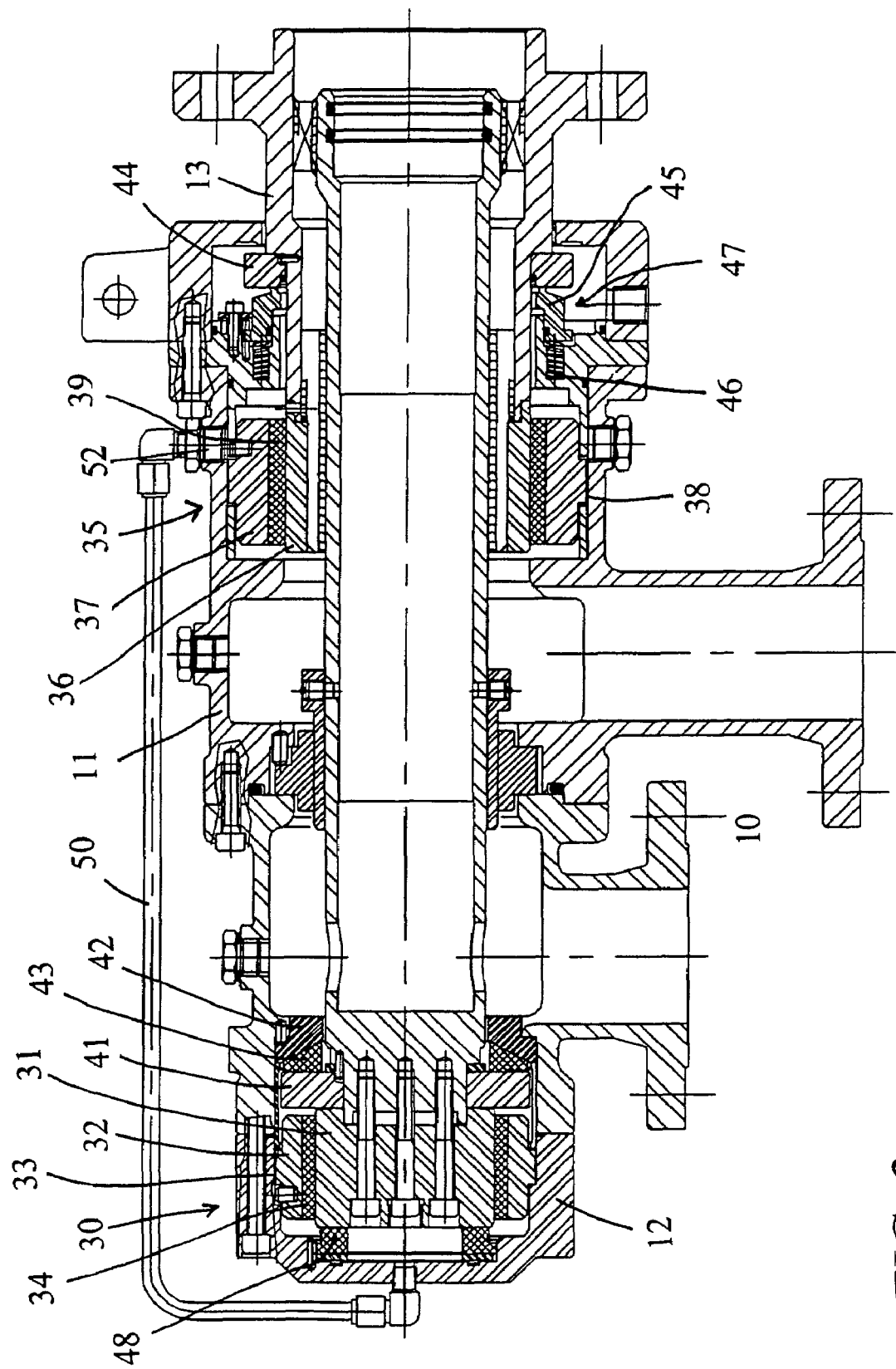
FIG. 3 illustrates a self-supported rotating union incorporating the hydrodynamic bearing system which includes a pair of bushing bearings for mounting and supporting the union housing on the rotor in accordance with the present invention.
Figure 4:
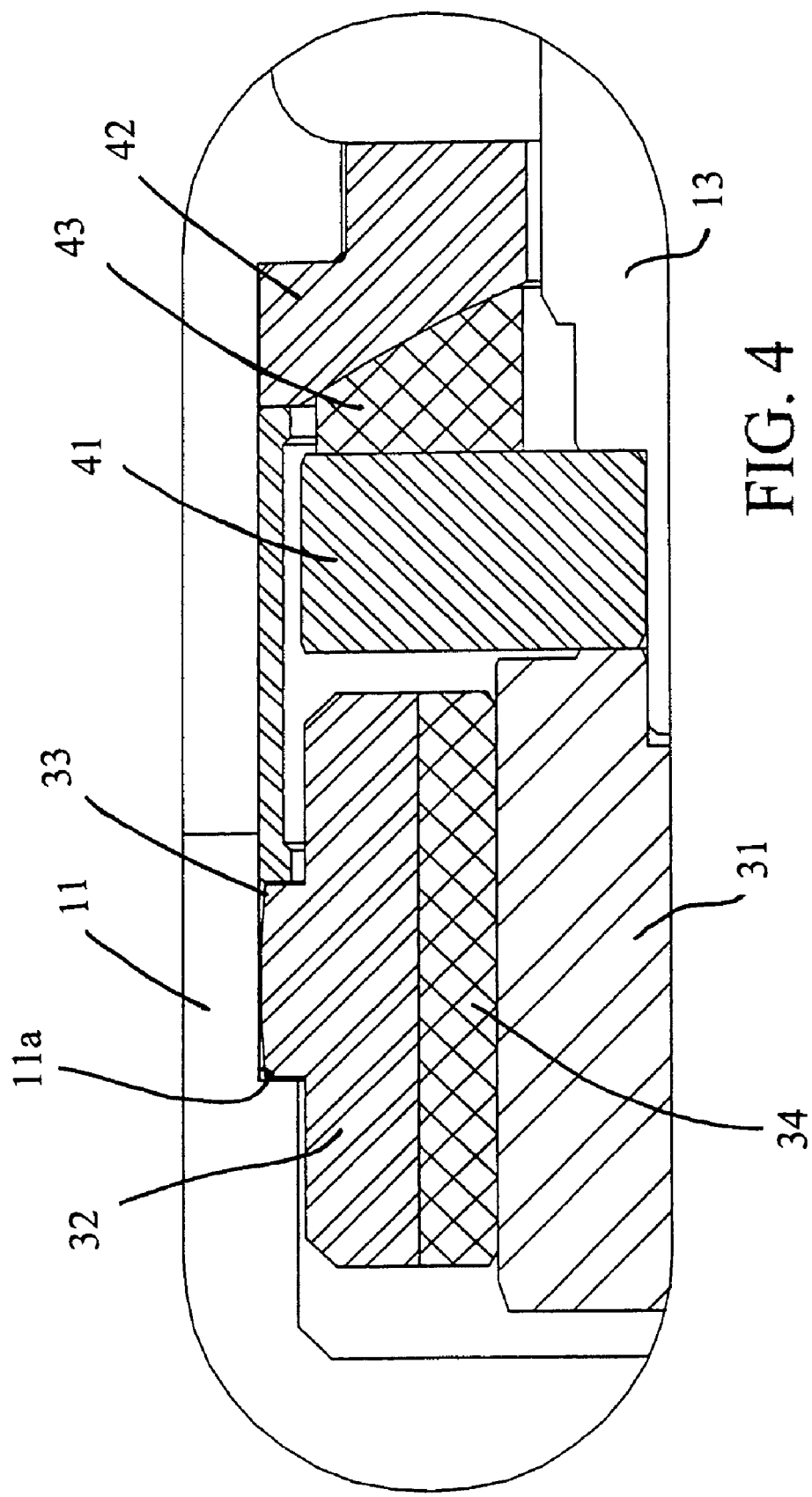
FIG. 4 is an enlarged view showing the relationship between the bearing housing member and the inner surface or bore of the rotary union housing in accordance with the present invention.

The novel rotary union in accordance with the present invention supplies a heat exchange fluid to a rotating load or rotor 13 and is shown in FIG. 3. The rotary union 10 includes a rear bushing bearing assembly 30 and a front bushing bearing assembly 35 which both provide support for the union housing with respect to the rotor or shaft 13. The rear bushing bearing assembly 30 includes a bearing sleeve member 31 mounted for rotation with the rotor 13 and a bearing housing member 32 having an outer curved radial surface 33 mounted within a bore 11a of the cylindrical housing 11, as shown in FIG. 4. The bearing housing member 32 includes a graphite wearing portion 34 which is structurally arranged to engage the bearing sleeve member 31 mounted on the rotor to assist retaining the housing 11 in alignment with respect to the rotating load or rotor 13. The front bushing bearing assembly 35 also includes a bearing housing member 37 having an outer curved radial surface 38 for cooperation with the bore of the housing 11 to facilitate alignment and support of the housing with respect to the rotor 13. The bearing assembly includes a graphite wearing portion 39 for receiving and engaging the bearing sleeve member 36 which is mounted to the rotor 13. The front bushing bearing assembly also is structurally arranged to assist retaining the housing within the desired operational alignment with respect to the rotor.

In each of the rear and front bushing bearing assemblies, the bearing housing member includes an outer curved radial surface 33 and 38, respectively, that is structurally arranged to engage the inside surface or bore 11a of the cylindrical housing member 11 to properly align the graphite wearing portions of the bushing bearing assemblies with the bearing sleeves mounted to the rotor. The outer curved radial surface 33 of the bearing housing member 32 is best shown in FIG. 4.

As shown in FIGS. 3 and 4, the rotary union 10 further includes a thrust bearing assembly comprised of a metallic thrust plate member 41 that is mounted and secured to the rotor 13 for rotation thereby, a metallic ring member 42 having a spherical contact surface and a carbon graphite spherical ring member 43 positioned between the thrust plate member and the metallic ring member. The carbon graphite spherical ring member presents a mating face at the junction between the counterface of the metallic ring member 42, which provides a structure which absorbs the mechanical load from the metallic thrust plate member 41.

The rotary union 10 includes also a front seal assembly 47 which is comprised of a rotating seal face member 44 secured to the rotor 13 and rotating therewith and a floating seal face member 45 that is biased by a spring 46 and mounted to the union housing 11. Engagement of the seal facings of the floating and rotating seal faces occurs when hot oil is passed through the union. This front seal assembly provides a seal which retains the fluid flow within the union 10.

A thrust ring member 48 is mounted to the head or end cap 12 of the cylindrical housing 11 and engages the bearing sleeve member 31 to resist the axial thrust forces within the rotating union 10. Additionally, a bypass line 50 communicates between the head 12 to an inlet port 52, which directs a portion of the heated fluid onto the front bushing bearing assembly 35 to lubricate and flush the same.

By positioning the rear and the front bushing bearing assemblies 30 and 35, respectively, within the front sealing assembly 47, both the rear and the front bushing bearings are situated within the fluid flow of the hot oil within the rotating union. This structure eliminates the need for external lubrication of the bushing bearing assemblies with expensive high temperature greases or lubricants, and there is substantially no change in the physical properties of the hydrodynamic bearing system with the temperature changes required of the pumped fluid within the union. This result occurs because the thrust bearing assembly does not provide any sealing of the rear bushing bearing assembly from the flow of oil or lubricant through the rotating union.

A rotating union in accordance with the present invention is operable within ranges of up to 600° F. and up to about 1,000 RPMs.

We claim:

1. A rotary union for delivery of a heat exchange fluid to a rotating load, including in combination:
    a union housing having a bore therein;
    a rotor mounted for rotation within the bore of said housing for delivery of a heat exchange fluid to the rotating load,
    a first bushing bearing assembly mounted for rotation with the rotor and positioned within said bore of said union housing;
    a second bushing bearing assembly mounted for rotation with the rotor and positioned within said bore of said union housing;
    a thrust bearing assembly comprised of a thrust plate member secured to said rotor, a metallic ring member having a spherical contact surface and a graphite spherical ring member having a mating contact face structurally arranged to engage said spherical contact surface to absorb the mechanical load from said thrust plate member; and
    a seal assembly comprised of a rotating seal member secured to said rotor and a floating seal member supported within said union housing and positioned forwardly of said second bushing bearing assembly to provide a seal which retains the heat exchange fluid within the union housing to lubricate said first and second bushing bearing assemblies during delivery of the heat exchange fluid to the load.

2. The rotary union in accordance with claim 1, wherein at least one of said first bushing bearing assembly and said second bushing bearing assembly is comprised of a bearing sleeve member mounted for rotation with said rotor and bearing housing member mounted within said bore of said union housing.

3. The rotary union in accordance with claim 2, wherein said bearing housing member includes a graphite wearing portion which engages said bearing sleeve member and wherein said bearing housing member has an outer radial curved surface which is structurally arranged to engage said bore of said union housing to align said graphite wearing portion with said bearing sleeve member.

4. The rotary union in accordance with claim 1, wherein said floating seal member is biased by a spring member to provide a seal which retains the heat exchange fluid within the union housing during delivery of the fluid to the load.

5. The rotary union in accordance with claim 1, wherein said thrust bearing assembly is positioned on said rotor between said first and said second bushing bearing assemblies.

6. The rotary union in accordance with claim 1, wherein said union housing includes an end cap secured thereto, with said end cap having a thrust ring member which resists axial thrust forces within the rotary union during delivery of the heat exchange fluid to the rotating load.

7. The rotary union in accordance with claim 6, wherein said union housing includes an inlet port and a bypass line, with said bypass line extending between said end cap and said inlet port to direct heat exchange fluid to said second bushing bearing assembly.

8. A rotary union for delivering pressurized thermoconductive fluid from a stationary conduit to a machine, said rotary union comprising:
    a union housing having a bore therein;
    a rotating rotor member communicating with the machine and structurally arranged to be mounted for rotation within the union housing bore to deliver the thermoconductive fluid to the machine;
    a mechanical seal assembly including a rotating seal ring member secured to said rotor member and a spring biased floating seal member mounted within said union housing and structurally arranged to engage said seal ring member when pressurized thermoconductive fluid is passing through the rotary union;
    a pair of bushing bearing assemblies located within said union housing, with each assembly being hydrodynamically lubricated by the thermoconductive fluid and supporting said union housing on said rotor member; and
    a thrust bearing assembly positioned within said union housing for absorbing the axial forces created by the pressure of the thermoconductive fluid on said thrust bearing assembly, with said thrust bearing assembly being hydrodynamically lubricated by said thermoconductive fluid, and wherein said thrust bearing assembly includes a rotating thrust plate member mounted to said rotor member, a stationary spherical-shaped thrust plate member mounted within said bore of said union housing and a carbon graphite sliding ring member positioned between said rotating thrust plate member and said stationary spherical-shaped thrust plate member for absorbing the axial forces from said rotating thrust plate member.

9. The rotary union in accordance with claim 8, wherein said bushing bearing assemblies include a bearing sleeve member mounted for rotation with said rotor member and a bearing housing member mounted within said bore of said union housing.

10. The rotary union in accordance with claim 9, wherein said bearing housing member includes a graphite wearing portion which engages said bearing sleeve member and wherein said bearing housing member has a spherical external diameter surface which is structurally arranged to pivotally engage said bore of the internal surface of said housing to align said graphite wearing portion with said bearing sleeve member.

11. The rotary union in accordance with claim 8, wherein said thrust bearing assembly is positioned within said union housing between said pair of bushing bearing assemblies.

12. The rotary union in accordance with claim 8, wherein said union housing includes an end cap secure thereto, with said end cap having a thrust ring member which resists axial thrust forces within the rotary union during delivery of the thermoconductive fluid to the machine.

13. The rotary union in accordance with claim 12, wherein said union housing includes an inlet port and a bypass line, with said bypass line extending between said end cap and said inlet port to direct heat exchange fluid to at least one of said pair of bushing bearing assemblies.

\* \* \* \* \*